United States Patent [19]

Weyer et al.

[11] Patent Number: 4,972,088

[45] Date of Patent: Nov. 20, 1990

[54] REGISTER MARK DETECTION

[75] Inventors: John H. Weyer, Hertfordshire; Jeffrey Isherwood, Middlesex, both of England

[73] Assignee: Crosfield Electronics Limited, London, England

[21] Appl. No.: 328,418

[22] Filed: Mar. 24, 1989

[30] Foreign Application Priority Data

Mar. 25, 1988 [GB] United Kingdom ................. 8807161

[51] Int. Cl.$^5$ .............................................. G01N 21/86

[52] U.S. Cl. ...................................... 250/548; 250/557

[58] Field of Search ................ 250/548, 557; 356/399, 356/400, 401

[56] References Cited

U.S. PATENT DOCUMENTS 4,067,760 1/1978 Nelson ................................ 250/548
4,857,745 8/1989 Gough ................................ 250/557

FOREIGN PATENT DOCUMENTS 2044306 3/1972 Fed. Rep. of Germany .
381713 10/1964 Switzerland .
1357648 6/1974 United Kingdom .

*Primary Examiner*—David C. Nelms
*Attorney, Agent, or Firm*—Sughrue, Mion, Zinn, Macpeak & Seas

[57] ABSTRACT

A method of and apparatus for detecting a register mark on an elongate web (3) is described. The web (3) carries a number of copies of an image (4) spaced apart along the web (3) and a region of the path along which the web (3) moves is irradiated with infra-red radiation by a source (5). The region is viewed with a series of detectors (1D–1F) as the web (3) passes through the irradiated region and the output levels of the detectors (1D–1F) are monitored for changes in their output levels. An edge extending transverse to the direction of movement (2) of the web (3) is then selected within the image (4) when the monitored changes in the output levels of all the detectors (1D–1F) satisfy predetermined criteria. The edge is then used for subsequent register control.

10 Claims, 7 Drawing Sheets

FIG. 5
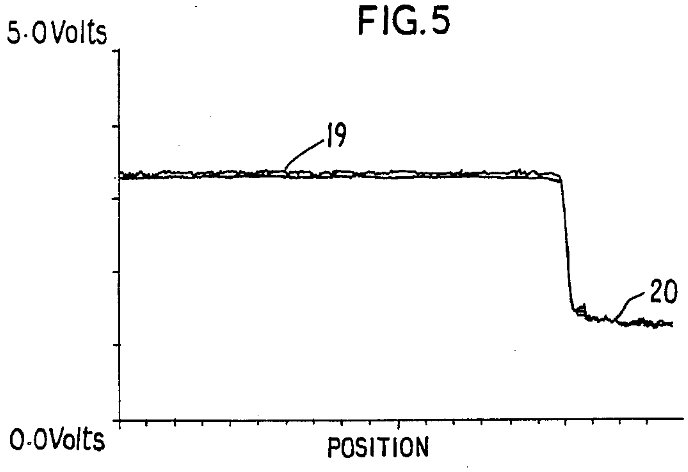
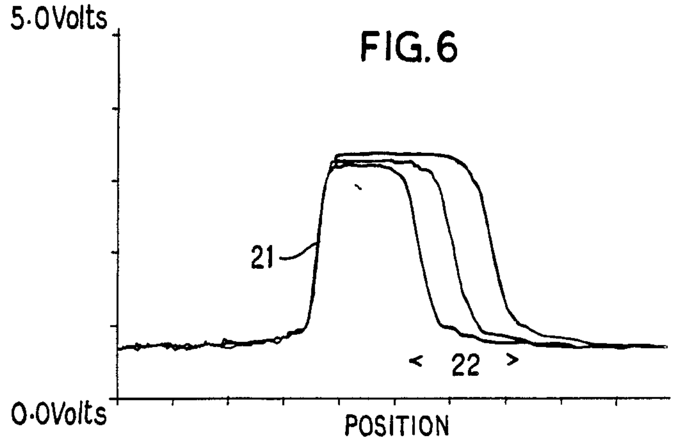
FIG. 6

REGISTER MARK DETECTION

FIELD OF THE INVENTION

The invention relates to methods and apparatus for detecting a register mark on a web carrying a series of identical images spaced apart along the web.

DESCRIPTION OF THE PRIOR ART

When a continuous web of paper is printed with a succession of similar images such as pages and other operations are to be performed on the web in positions controlled by the positions of the images, some form of register control becomes necessary. Examples of such systems are multi-colour presses in which further colour component representations of the images which are printed on the web must be maintained in register with the first colour components, and folding or cutting machines in which the operation of the folding or cutting machine must be synchronized with the arrival of the preprinted images. Register control is normally carried out by printing register marks on the web and using light-sensitive cells to detect the passage of these marks.

One of the most awkward practical problems of a photoelectronic register control is to arrange that the error measuring circuits are controlled by the register marks only and not by the remainder of the print. The simplest solution is to have a clear strip of paper running along the edge of the web and to place the register marks in this. Frequently, it is impractical to have this arrangement, however, because paper is expensive and printers are not prepared to provide margins which are used only for the register marks.

In an alternative arrangement the register marks are printed in an area between the picture areas on the web and a small impulse generator is coupled to the printing press and is used to switch on and off the photocell circuits at moments such that they are only effective when they are scanning the transverse strip of the web between the picture areas. This prevents the photocells from being influenced by marks within the picture areas themselves, but requires that, in order to accommodate different webs, it is necessary for the printer to align the impulse generator with respect to the photocell and register marks at the beginning of each printing run.

US-A-3,439,176 describes a method of sensing register marks provided between images on a web in which a line of sensors is provided and a register mark is detected if there is sufficient clear space both before and after the mark and beside the mark.

SUMMARY OF THE INVENTION

In accordance with one aspect of the present invention, a method of detecting a register mark on an elongate web carrying a number of copies of an image spaced apart along the web, the mark being constituted by an edge within the image and extending transverse to the direction of movement of the web, comprises irradiating a region of the path along which the web moves in use; viewing with a series of radiation sensitive detectors the irradiated region as the web passes through the irradiated region; monitoring for changes in the output levels of the detectors; and detecting said edge for subsequent register control when the monitored changes in the output levels of all the detectors satisfy predetermined criteria.

In accordance with a second aspect of the present invention, apparatus for detecting a register mark on an elongate web carrying a number of copies of an image spaced apart along the web comprises means for irradiating a region of the path along which the web moves in use; a series of radiation sensitive detectors for viewing the irradiated region as the web passes through the region; and processing means for monitoring for changes in the output levels of the detectors, and for selecting an edge extending transverse to the direction of movement of the web for subsequent register control when the monitored changes in the output levels of all the detectors satisfy predetermined criteria.

We have recognized that simple length register control requires only a straight edge running transverse, preferably substantially at right angles to the direction of web movement in order to measure the register error relative to the press or another similar edge. In many printing applications there is a high probability of finding a straight or near straight edge within the printed matter itself. Examples of suitable edges are:

(a) Edges of picture blocks
(b) Edges of text columns
(c) Thin line borders
(d) Edges within picture blocks due to density or colour changes.

Thus, the invention does not require the use of separate register marks but instead detects a suitable edge as the register mark within the image itself.

In its simplest form, the output levels of the detectors may be compared with a single criterion. However, preferably the output levels are compared with a number of different criteria such as:

1. The rise time (ie the time for the output level to change between levels);
2. The straightness and orthogonality of the edge;
3. The amplitude of the change in order to avoid loss of the edge due to noise or print density variations;
4. A sufficient distance fore or aft of the edge clear of similar edges so as to allow the maximum measurement range without falsely measuring the wrong edge;
5. Sufficient print thickness for reliable detection;
6. Whether the edge goes from a high level to a low level, or from a low level to a high level;
7. The magnitude of the low level; and,
8. The magnitude of the high level.

Preferably, if an edge satisfying the predetermined criteria cannot be detected in a first pass, the method is repeated with the illuminated region either enlarged laterally or shifted laterally. Lateral movement could be achieved either by causing relative physical movement between the series of detectors and the web path or by selecting a different set of detectors from a larger, fixed linear array. Similarly, enlargement of the region could be achieved by selecting previously unused detectors in a large linear array.

Additionally, or alternatively, if an edge cannot be found in a first pass which satisfies the predetermined criteria, the method may be repeated one or more times, one or more of the criteria being varied on each pass. Typically, each criterion will be varied between an optimum value and a predetermined minimum value.

For example, each criterion could comprise a threshold with which the output levels from the detectors are compared, the thresholds being selectively decreased in subsequent passes to the predetermined minimum.

Once a satisfactory edge has been located using the above process, the web is then processed in a conventional manner by feeding it through a control system which monitors the position of the edge in each image and adjusts the passage of the web accordingly. An example of a typical system making use of this web register control method is the feeding of several webs to a common cutting station with the requirement that the images on each web should be in register prior to reaching the cutting station.

Typically, the region will be irradiated with infra-red radiation although ultra-violet or visible light could also be used. In each case the detectors will be selected so as to be sensitive to the irradiating wavelength.

BRIEF DESCRIPTION OF THE DRAWINGS

An example of a method and apparatus for detecting a register mark in accordance with the present invention will now be described with reference to the accompanying drawings, in which:

FIGS. 2, 3, 4 and 5 are magnified views similar to FIG. 1 and illustrating the photodetector outputs for four different types of edge;

FIG. 6 illustrates the three photodetector output signals for an orthogonal front edge and a sloping back edge;

DETAILED DESCRIPTION OF THE PREFERRED EMBODIMENTS

Figure 8:
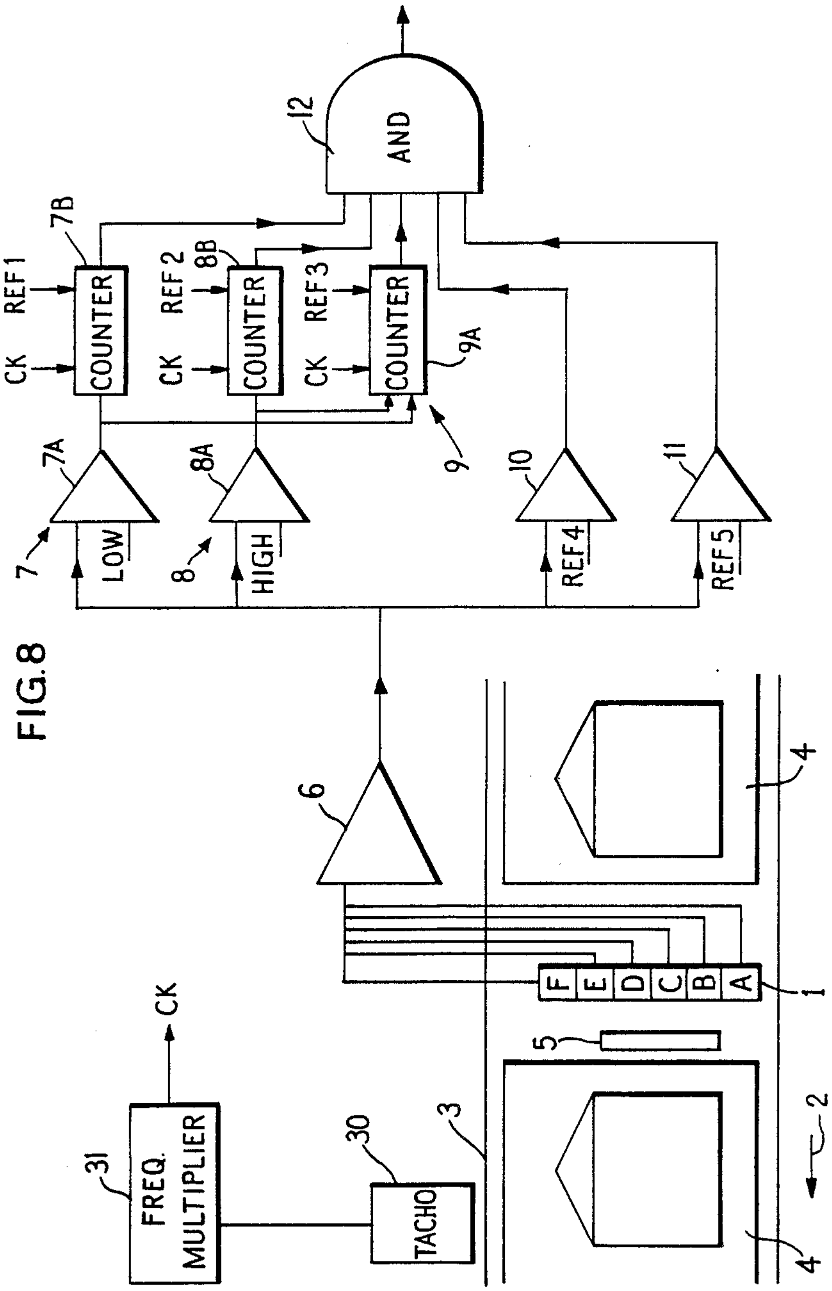
FIG. 8 is a block circuit diagram of a first example of the apparatus.

The apparatus shown in FIG. 8 can be used both to determine the existence of an acceptable edge within an image for use in subsequent register control and the register control process itself. The apparatus comprises a linear array 1 of 6 photodetectors, such as photo diodes, 1A-1F. The array is positioned orthogonally to the direction of movement 2 of a web 3 carrying a series of images 4 of a magazine page. The detectors are only shown schematically in FIG. 8 and will typically extend over a small portion only of the width of the images 4. The detectors receive reflected light from the web 3 within a region illuminated by a light source 5 such as a set of infra-red light emitting diodes.

Each detector in the array 1 is connected to a summing AGC amplifier 6 whose output is connected in parallel to a series of five comparator systems 7-11. Each comparator system 7-11 also receives a respective reference signal (labelled REF 1-REF 5) and the output signals from the comparator systems are fed to an AND gate 12.

In this example, the comparator system 7 is used to determine whether there is a region either before or after an edge which is clear of similar edges and which is of a sufficient length (for example 50 mm (REF 1)). The comparator system will issue a binary "1" signal if such a length is detected. The system 7 includes a comparator 7A to which the signal from the amplifier 6 and a low voltage signal are fed to that when the voltage signal is exceeded (corresponding to high intensity radiation), the output goes high. This high output initiates a counter 7B which counts up until a count corresponding to REF. 1 is reached. At this point the binary "1" signal is issued. The counter 7B counts at a rate (CK) derived from the speed of the web 3. This speed is monitored by a tachometer 30 connected to a frequency multiplier 31 which generates the clock signal CK. Typically the clock signal comprises pulses at a rate of 10 per mm of web travel, with web speeds up to 20 meters/sec.

The comparator system 8 determines whether an edge has a sufficient width in the direction of movement of the web by comparing the width with a threshold (REF 2) which initially will be set to about 1 mm. Thus, if the detected width is greater than 1 mm, the comparator 8 will issue a binary 1. This is achieved by feeding the signal from the amplifier 6 to a comparator 8A to which a high voltage signal is also fed. The output of the comparator 8A is fed to a counter 8B which counts at the clock rate CK when the voltage from the amplifier 6 corresponds to radiation from an edge. The counter 8B counts up to a count corresponding to REF 2 at which point a binary "1" is issued.

The comparator system 9 comprises a counter 9A which is activated and deactivated by the signals from comparator systems 7A, 8A so as to compare the rise or fall time of the edge determined by the time for the output level to change from one level to the other, with a count corresponding to a threshold REF 3 typically measured as the distance of movement of the web within that time such as 1 mm. If the count is exceeded then the output becomes a binary "0".

The comparator 10 compares the amplitude of the edge, for example in terms of the difference in voltage level between the two output levels from the summing amplifier 6, with a predetermined threshold REF 4 set for example at 2.4 volts.

Finally, the comparator 11 determines whether the area of the image corresponding to the low output level from the detectors has a sufficiently low absolute value (REF 5), typically 0.85 volts.

In use, during an initial setting up stage, the web is passed beneath the linear array of detectors 1 and signals from the detectors 1D-1F only are used. These signals are summed by the amplifier 6 and fed to the comparator systems 7-11. If all the initially set thresholds are satisfied, a set of five binary 1s will be fed to the AND gate 12 which will indicate that a suitable edge has been located. If, however, one of the parameters is not satisfied, then the appropriate reference is changed by one step towards a limit value and the scan repeated. The table below gives typical examples of the start and limit values for each comparator system.

| Parameter | | Start | Limit |
|---|---|---|---|
| Clear Distance | (7) | 50 mm | 10 mm |
| Print width | (8) | 1 mm | 0.4 mm |
| Rise or fall time | (9) | 1 mm | 1.8 mm |
| Edge Amplitude | (10) | 2.4 volts | 0.5 volts |
| Low Level print | (11) | 0.85 volts | 2.1 volts |

Once a set of parameters is satisfied, the resulting edge can be used for subsequent register control. At this stage, the position of the edge within the image is known and during the subsuquent web feeding process, the photodetectors can be used just to monitor a region within which it is known that the edge should appear.

In addition, it is not necessary to use the comparator systems 8B and 11. In operation, the summed signals from the detectors 1D–1F are fed via the summing amplifier 6 to the comparator systems 7, 8A, 9 and 10 which are fed with the reference values REF 1, REF 3, and REF 4 used in the final pass of the detection stage. The output signals from the comparator systems 7, 8A, 9, 10 are monitored during the period an edge is expected, an output pulse being generated from the AND gate 12 as the edge passes the detectors. This pulse may then be used in a conventional manner, as for example described in US-A-3,439,176, to control movement of the web.

Alternatively, the pulse may be used in conjunction with an encoder which outputs a pulse for every revolution of a roller which feeds the web. The position of the encoder pulse is then subtracted from the position of the edge to obtain a measurement for controlling the web.

This is of particular interest for ribbon folder applications where a modular design approach is used. Each measuring module uses the same measuring technique. The common control module then uses the measurement directly for control of the web or subtracts it from the measurement from another ribbon to produce a ribbon to ribbon system control of the web.

This method of measurement counts clock pulses between the 1 pulse per revolution and the edge. The clock rate varies in proportion to web speed. Errors in the clock rate can be measured by a processor by counting the number of clock pulses between two consecutive 1 pulse per revolution pulses. This error can then be used to correct the edge - encoder pulse measurements and also to produce a correction signal to the clock generator. This method of measurement and control also has the advantage of a clock system with a very fast response to press speed changes and transients and is very cost effective compared with the conventional frequency multiplier system.

If during the setting up stage, an acceptable edge cannot be determined using the photodetectors 1D–1F and with all the reference values set at their limits, the region can be increased by making use of the outputs from the adjacent detectors 1A–1C. In addition, the linear array 1 could be moved laterally relative to the web 3.

Although not shown, the viewing angle of the photodetector array 1 is limited to optical masks and viewing lenses.

Figure 1:
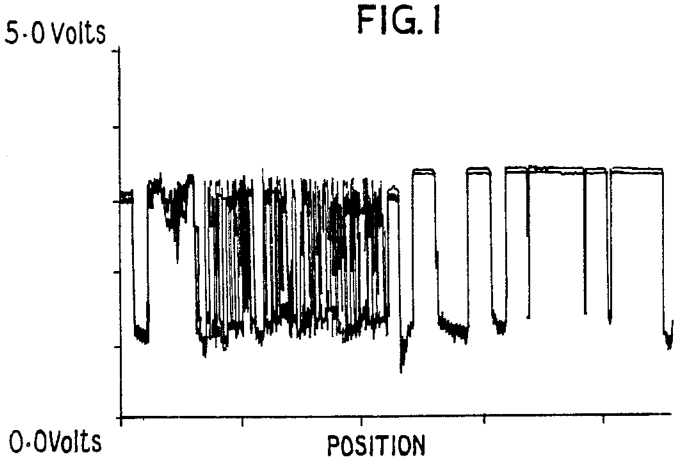
FIG. 1 illustrates typical output signals from three photodetectors scanning a magazine page.

FIG. 1 illustrates the output signals from the three sensors 1D–1F while scanning a typical magazine page with a scanning area having a width in the web direction of about 0.5 mm and a length orthogonal to the web direction of about 6 mm, the scan extending along a track having a length of about 460 mm.

Figure 2:
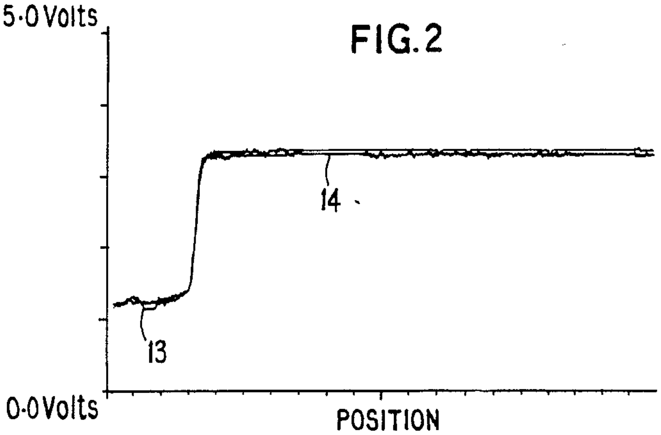

FIGS. 2–5 illustrates four examples of the output signals from the detectors 1D–1F on a much more magnified scale than FIG. 1 when monitoring an edge suitable for register control. It will be seen in each case that the output signals are virtually identical indicating that the edge itself is substantially orthogonal to the web direction. FIG. 2 illustrates a transition from a dark area 13 of the image, such as a line of text, to a clear, bright region 14 having a relatively large dimension in the web direction.

Figure 3:
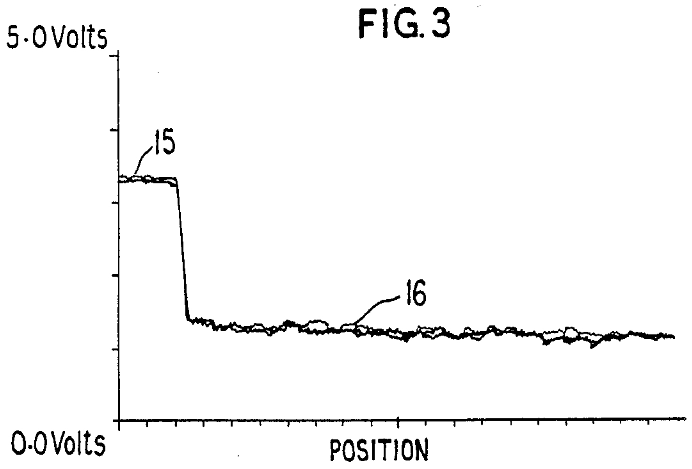

FIG. 3 illustrates an edge between a bright region 15 and a dark region 16 having a relatively large dimension in the web direction.

Figure 4:
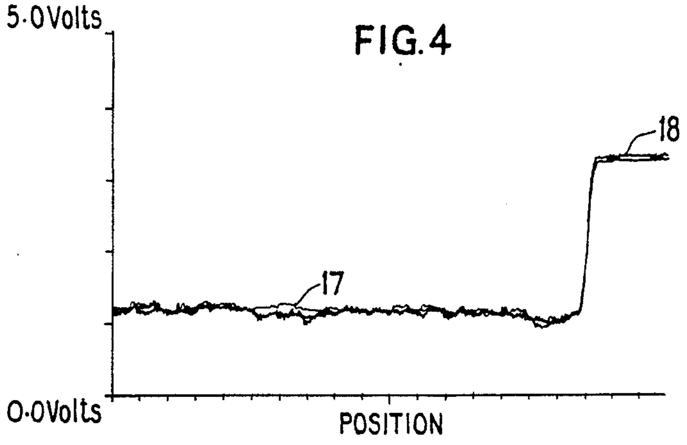

FIG. 4 illustrates an edge between a dark region 17 upstream of the edge and having a relatively long dimension in the web direction and a bright region 18 downstream of the edge.

FIG. 5 illustrates an edge between a bright region 19 upstream of the edge and having a relatively long dimension in the web direction and a dark region 20 downstream of the edge.

Figure 7:
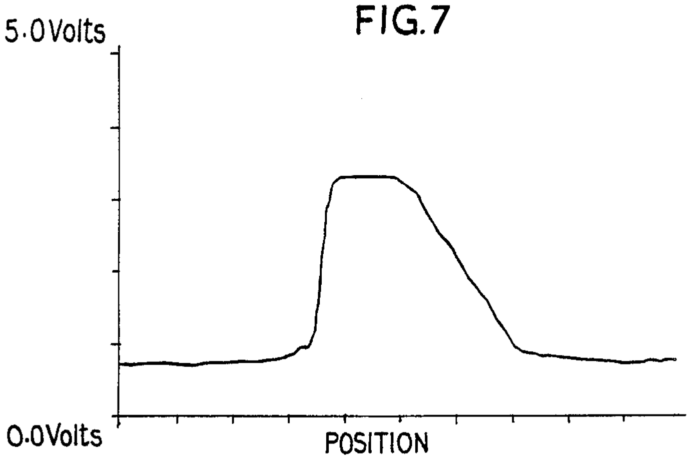
FIG. 7 illustrates the output of the summing amplifier of FIG. 8 when fed with the signals shown in FIG. 6.

FIG. 6 illustrates the three output signals from the detectors 1D–1F during the passage of an orthogonal leading edge and a trailing edge which is sloped relative to the web. It will be seen in FIG. 6 that the output signals from the detectors are nearly coincident as the leading edge 21 passes beneath the detectors but are spaced apart during passage of the trailing edge 22. When these three signals are summed in the summing amplifier 6, the resultant signal is as shown in FIG. 7. The leading edge would be considered acceptable by the processing logic while the trailing edge 22 would be unacceptable as determined by the comparator 9 since the fall time would exceed the reference value REF 3.

Figure 9:
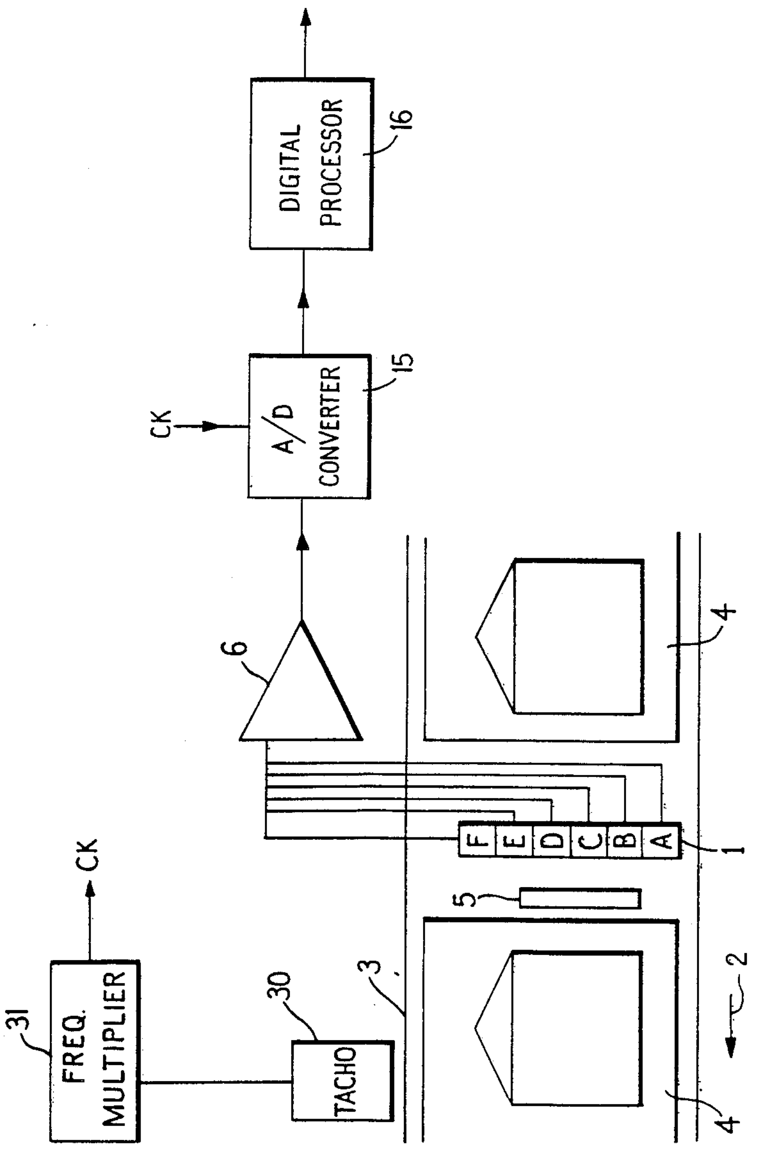
FIG. 9 is a block circuit diagram of a second example of the apparatus; and, FIG. 10 is a flow diagram illustrating the operation of the apparatus shown in FIG. 9.

Although the apparatus has been shown as a hardware implementation, it could also be implemented in software, as shown in FIG. 9. If a software implementation is used, an analogue to digital converter 15 is required after the summing amplifier 6 which is controlled by the clock input CK and which samples at ten pulses per mm. The result is then output to a digital processor 16 where the data is analysed according to the flow diagram shown in FIG. 10. This is a software serial analogue of the hardware parallel implemention shown in FIG. 8.

Figure 10:
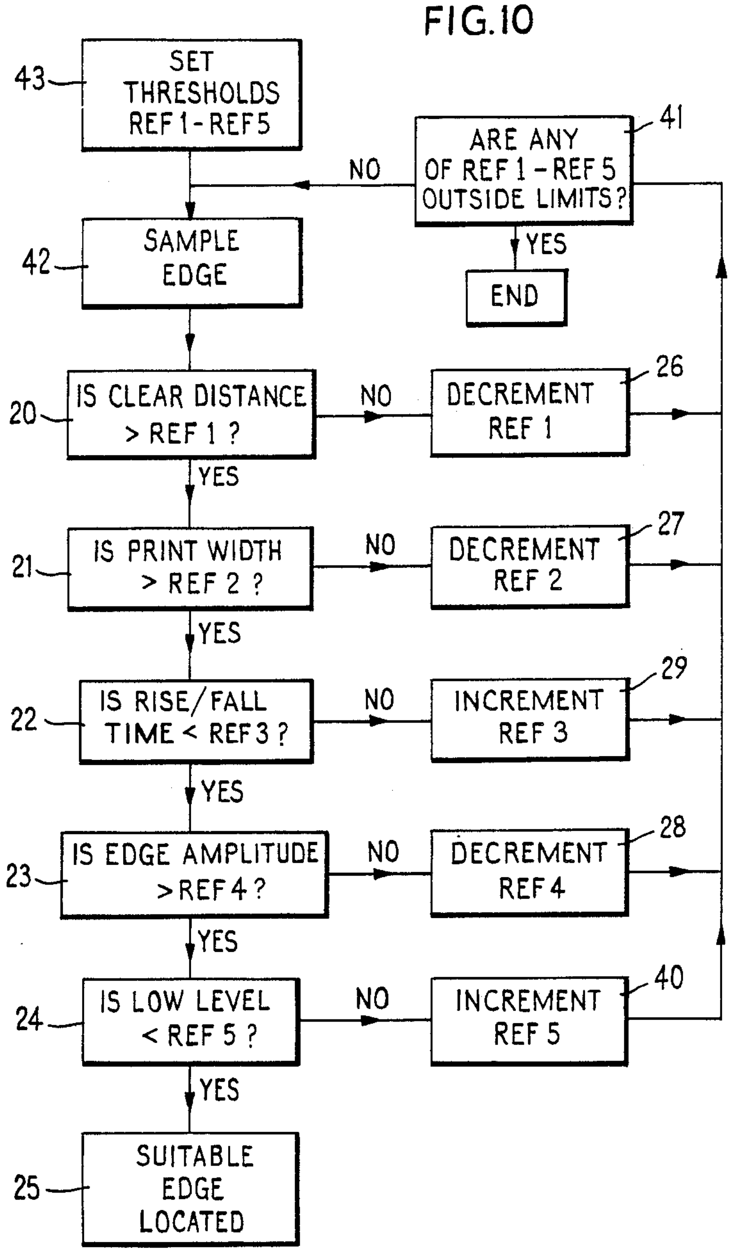

Initially, the thresholds REF 1–REF 5 are set 43 to their start values, shown in the table above. An edge is then scanned 42 by the diodes 1D–1F and the output from the analogue to digital converter 15 stored in the processor 16. If all the criteria 20–24 in FIG. 10 are satisfied for the edge which has been scanned the processor 16 outputs a signal indicating that a suitable edge has been located 25. If any of the criteria 20–24 are not satisfied then the appropriate reference threshold REF 1–REF 5 is either decremented 26–28 or incremented 29, 40 accordingly. The thresholds are then checked 41 to ensure that they are all still within the limits given in the table above, and the edge is scanned again. The process continues until a suitable edge has been located. If no edge is located before one threshold exceeds its limit, the scanning area is altered as outlined above.

FIGS. 8 and 9 illustrate the use of a multi-photodetector array feeding into a single summing amplifier 6. In other alternative implementations, not shown, a single photodetector and suitable optics could be used to scan a line of the image. Such a system is particularly cost effective. In a further alternative, a number of photodetectors may be used, as in FIG. 8, but connected to individual amplifiers and individual comparators in order to measure the straightness of the edge. This system would provide greater selectivity on straight edge detection.

FIGS. 8 and 9 show the photodetectors positioned so as to receive reflected radiation directly. However, this invention is particularly suited to the use of fibre optic heads. A fibre optic scanning head requires little maintenance while the fibre optics themselves can be bundled together and are not susceptible to interference or vibration while allowing the light source and detectors to be mounted in a safe area.

In order to increase the recognition security and improve the immunity to large jumps in position a multiple edge recognition system can be used. In this system the parameters for several recognisable edge features in sequence are stored, and used for subsequent measurement and tracking.

We claim:

1. A method of detecting a register mark on an elongate web carrying a number of copies of an image spaced apart along said web, said mark being constituted by an edge within said image and extending transverse to the direction of movement of said web, said method comprising irradiating a region of the path along which said web moves in use; viewing, with a plurality of radiation sensitive detectors, said irradiated region as said web passes through said irradiated region; monitoring for changes in the output levels of said detectors; and designating said edge for subsequent register control when said monitored changes in said output levels of all said detectors satisfy predetermined criteria.

2. A method according to claim 1, wherein said designating step comprises designating an edge that runs substantially at right angles to said direction of web movement.

3. A method according to claim 1, wherein said designating step comprises the step of designating said edge for subsequent register control when said monitored changes in said output levels satisfy said predetermined criteria, including one or more of the rise time, the straightness and orthogonality of said edge, the amplitude of the change, the distance fore and/or aft of said edge clear of similar edges, and the print thickness.

4. A method according to claim 1, wherein if an edge satisfying said predetermined criteria cannot be detected in a first pass, said method is repeated with said illuminated region either enlarged laterally or shifted laterally.

5. A method according to claim 1, wherein if an edge cannot be found in a first pass which produce said monitored changes in said output levels which satisfy said predetermined criteria, said method is repeated one or more times, one or more of said criteria being varied on each pass such that different output levels will satisfy the predetermined criteria.

6. A method according to claim 5, wherein each criterion comprises a threshold with which said output levels from said detectors are compared, said thresholds being selectively decreased in subsequent passes to the predetermined minimum.

7. A method according to claim 1, wherein said region is irradiated with visible radiation.

8. A method according to claim 1, wherein said region is irradiated with ultra-violet radiation.

9. A method of controlling movement of an elongage web carrying a number of copies of an image spaced apart along said web, said mark being constituted by an edge within said image and extending transverse to the direction of movement of said web, said method comprising:

irradiating a region of the path along which said web moves in use;

viewing, with a plurality of radiation sensitive detectors, said irradiated region as said web passes through said irradiated region;

monitoring for changes in the output levels of said detectors;

designating said edge for subsequent register control when said monitored changes in said output levels of all said detectors satisfy predetermined criteria; and controlling movement of said web in accordance with said designating step.

10. Apparatus for detecting a register mark on an elongate web carrying a number of copies of an image spaced apart along said web, said apparatus comprising means for irradiating a region of the path along which said web moves in use; a plurality of radiation sensitive detectors for viewing said irradiated region as said web passes through said region; and processing means for monitoring for changes in the output levels of said detectors, and for selecting an edge extending transverse to the direction of movement of said web for subsequent register control when said monitored changes in said output levels of all said detectors satisfy predetermined criteria.

* * * * *